United States Patent
Rengarao Thyada

(10) Patent No.: US 10,521,218 B2
(45) Date of Patent: Dec. 31, 2019

(54) ENHANCED TECHNIQUES FOR UPDATING SOFTWARE

(71) Applicant: MICROSOFT TECHNOLOGY LICENSING, LLC, Redmond, WA (US)

(72) Inventor: Paramesh Babu Rengarao Thyada, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/845,939

(22) Filed: Dec. 18, 2017

(65) Prior Publication Data
US 2019/0108012 A1    Apr. 11, 2019

Related U.S. Application Data

(60) Provisional application No. 62/570,059, filed on Oct. 9, 2017.

(51) Int. Cl.
*G06F 8/65*    (2018.01)
*G06F 9/4401*    (2018.01)

(52) U.S. Cl.
CPC .............. *G06F 8/65* (2013.01); *G06F 9/4418* (2013.01)

(58) Field of Classification Search
CPC .................................. G06F 8/65; G06F 9/4418
USPC ......................................................... 717/168
See application file for complete search history.

(56) References Cited

U.S. PATENT DOCUMENTS

| | | | | |
|---|---|---|---|---|
| 6,922,831 B1* | 7/2005 | Kroening | .................. | G06F 8/60 717/172 |
| 2003/0066065 A1* | 4/2003 | Larkin | ...................... | G06F 8/65 717/177 |
| 2004/0236936 A1* | 11/2004 | Bulusu | ...................... | G06F 8/65 713/2 |
| 2008/0177994 A1* | 7/2008 | Mayer | .................. | G06F 9/4418 713/2 |

(Continued)

OTHER PUBLICATIONS

Hicks et al, "Dynamic Software Updating", 2005, [Online], pp. 1049-1096, [Retrieved from internet on Aug. 14, 2019], <http://delivery.acm.org/10.1145/1110000/1108971/p1049-hicks.pdf> (Year: 2005).*

(Continued)

*Primary Examiner* — S. Sough
*Assistant Examiner* — Zengpu Wei
(74) *Attorney, Agent, or Firm* — Newport IP, LLC; Mike R. Cicero

(57) ABSTRACT

Techniques for enabling a device that is configured to be repeatedly booted into a predefined "mission ready" functional state by loading hibernation data into a memory to utilize the hibernation data to generate the updated hibernation data based on system updates. Updates can be received during hibernation and the "mission ready" functional state can be repeatedly entered even after the system updates have been installed. The system updates may alter device drivers, an operating system and/or its corresponding registry and libraries, and/or an application. After receiving system updates, the device may enter an operating state using the system updates. A write filter can be used to protect certain sections of memory to avoid conflicts between the original system files and updated files.

20 Claims, 3 Drawing Sheets

(56) References Cited

U.S. PATENT DOCUMENTS

| | | | | |
|---|---|---|---|---|
| 2009/0307650 | A1* | 12/2009 | Saraf | G06F 8/65 |
| | | | | 717/101 |
| 2010/0287344 | A1* | 11/2010 | Abzarian | G06F 16/11 |
| | | | | 711/162 |
| 2010/0293538 | A1* | 11/2010 | Wolf | G06F 8/65 |
| | | | | 717/170 |
| 2011/0173603 | A1* | 7/2011 | Nakamura | G06F 8/65 |
| | | | | 717/173 |
| 2012/0324436 | A1 | 12/2012 | Milenovic | |
| 2013/0138783 | A1* | 5/2013 | Mallur | G06F 8/65 |
| | | | | 709/221 |
| 2016/0147542 | A1* | 5/2016 | Kishi | G06F 21/57 |
| | | | | 713/2 |
| 2017/0337050 | A1* | 11/2017 | Iwami | G06F 13/00 |

OTHER PUBLICATIONS

Jansen et al, "Integrated Development and Maintenance of Software Products to Support Efficient Updating of Customer Configurations: A Case Study in Mass Market ERP Software", 2005, [Online], pp. 1-10, [Retrieved from inernet on Aug. 14, 2019], <https://ieeexplore.ieee.org/stamp/stamp.jsp?tp=&arnumber> (Year: 2005).*

Subramanian et al, "Dynamic Software Updates: A VM-centric Approach", 2009, [Online], pp. 1-12, [Retrieved from inernet on Aug. 14, 2019], <https://suriya.github.io/papers/jvolve-pldi.pdf> (Year: 2009).*

"International Search Report and Written Opinion Issued in PCT Application No. PCT/US18/054052", dated Jan. 16, 2019, 14 Pages.

* cited by examiner

ENHANCED TECHNIQUES FOR UPDATING SOFTWARE

PRIORITY APPLICATION

This application claims the benefit of and priority to U.S. Provisional Application No. 62/570,059, filed Oct. 9, 2017, the entire contents of which are incorporated herein by reference.

BACKGROUND

Software updates can be important for computing devices under a variety of reasons. For example, software updates can improve the efficiency of a computing device by fixing software "bugs" and/or improve the security of a computing device by protecting against the ever-increasing number of malware threats. Under some circumstances, however, a computing device may be unable to accept software updates. For instance, when a conventional computing device is configured to repeatedly reenter a "mission ready" functional state that is designed to support a specific enterprise operation, such a device cannot receive updates to the operating system (OS) libraries and/or application libraries without losing the ability to reenter this "mission ready" functional state. Unfortunately, any limitation on allowing software updates may leave a computing device vulnerable to malware threats or other issues.

It is with respect to these and other considerations that the disclosure made herein is presented.

SUMMARY

Technologies described herein enable a computing device to receive and apply software updates without losing an ability to reenter a previously defined "mission ready" functional state. According to one illustrative example, a computing device may be loaded with an operating system (OS) and an application, and the OS may enable a user to utilize the application. The system may generate hibernation data defining a "mission ready" functional state (also referred to herein as "functional state") of the OS and some applications. The hibernation data can include a state of a function, a state of a library, etc. While in the operating state, the OS can also receive software updates from a remote resource. The software update may include updates to the libraries of the OS as well as updates to the application. In addition, the software update can include new applications. The original version of the OS can be maintained in a first memory block and the updates of the OS can be maintained in a second memory block. In addition, the original version of the hibernation data can be stored in a third memory block.

While in an update installation state, the OS disables a write filter (e.g., a Unified Write Filter (UWF)). Generally described, a write filter is a feature to protect physical storage media from data writes. A write filter can intercept all write attempts to a predetermined volume and redirects those write attempts to a virtual overlay or a designated volume. In such configurations, the write filter may be temporarily disabled so that the updated OS and the updated hibernation data can be saved to a predetermined section of storage media.

In some embodiments, software updates that are received are written to the second memory block, which is separate from the first memory block and the third memory block. In addition, the computing device determines a set of libraries or functions that are impacted by the software update. Any updated libraries or functions that are related to libraries or functions indicated in the hibernation data are identified. The computing device then updates the relevant parts of the hibernation data to generate updated hibernation data that accommodates the software update. If the software update includes a new application, the hibernation data is updated to accommodate the new application. While in the update installation state, standard operation functionality of the computing device is disabled (i.e., a user is prevented from using the device in a user mode).

In some embodiments, the hibernation data is updated based on the software update so that the desired "mission ready" functional state of the OS and/or the application can be resumed into on the updated OS just as it could be resumed into on the previous version of the OS. For example, modifications to various parameters of the OS may be analyzed to determine whether the modifications impact the hibernation data. If the modifications do impact the hibernation data (e.g., due a register being changed, etc.) then the hibernation data is updated accordingly. The updated hibernation data can be stored in a fourth memory block separate from the first, second and third memory block. Hibernation data related to any new applications can be written to the fourth memory block.

When the computing device transitions from the update installation state back into the "mission ready" functional state, the UWF can be enabled. The computing device operated from the second memory block and the fourth memory block. Thus, the computing device can operate on the new version of the OS as well as the updated hibernation data, enabling the computing device to operate new aspects of an updated application or operate new applications. During each transition from a resume ready state to the functional state, the computing device can read data from the second and fourth memory blocks, e.g., the updated OS data and the updated hibernation data.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
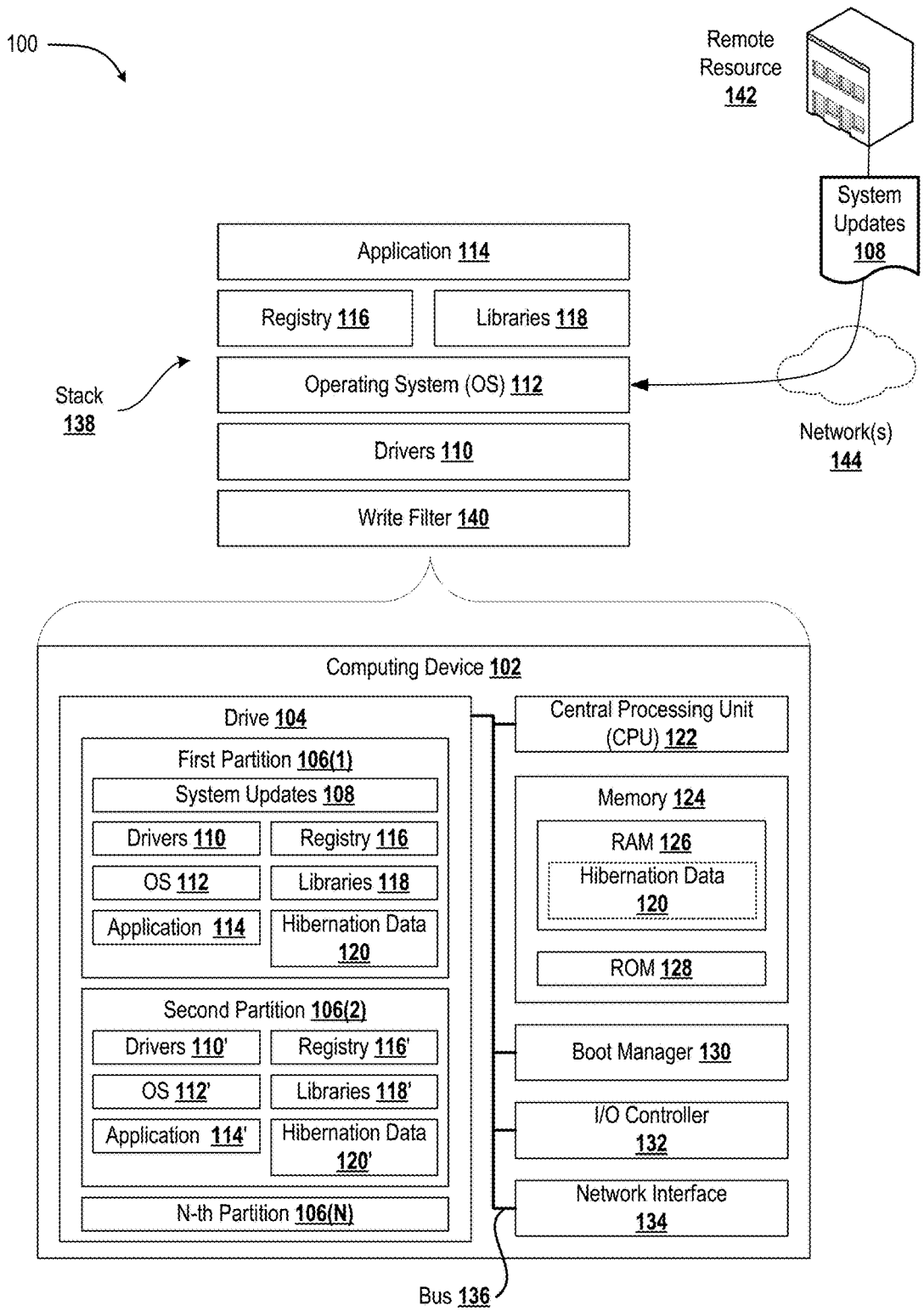
FIG. 1 illustrates an exemplary computing architecture for enabling a system to receive system updates after being configured to repeatedly resume into a functional state and to maintain an ability to repeatedly resume into this predefined functional state following installation of the system updates.

The following Detailed Description describes systems and methods that enable a computing device to install system updates without losing an ability to repeatedly resume into a predefined "mission ready" functional state. In particular, configurations disclosed herein enable a computing device to repeatedly transition between a resume ready state and the "mission ready" functional state after software updates are installed. As used herein, the term "resume ready state" may generally refer to an operation state from which a computing device is configured to transition back into a "mission ready" functional state (e.g., the computing device is ready to resume back into the functional state). As used herein, the term "'mission ready' functional state" may refer generally to a specific user mode operational state that is designed to support a specific operation (e.g., an enterprise operation that supports business functions and/or home operations that support home-centric functions). Exemplary "mission ready" functional states include, but are not limited to, a medical application being open and readied to receive a particular field of patient information and/or a retail application being open and readied to scan a bar code of tagged merchandise and/or credit card information. The computing device can generate hibernation data that defines and/or is usable to reenter the "mission ready" functional state.

The computing device can disable a write filter so that system updates can be received and/or written to a first predetermined memory block which may be separate from a memory block storing the original Operating System libraries and original application libraries. The updates are analyzed to determine if any of the updates impact aspects of the hibernation data. Aspects of the hibernation data that are impacted by the update cause the computing device to generate updated hibernation data that is written to a second predetermined memory block. When the computing device transitions back into the "mission ready" functional state following the system updates being installed, the computing device reads the updated software from the first predetermined memory block and updated hibernation data from the second predetermined memory block. By reading the updates from the predetermined memory blocks, the computing device can return to an operating state using the updated software. The updated hibernation data can be accessed so that the "mission ready" functional state can be repeatedly entered even after the system updates have been installed. Exemplary updates include, but are not limited to, updates to one or more device drivers (hereinafter referred to as "drivers"), updates to an operating system (OS), and/or updates to an application. For illustrative purposes, a memory block (which also referred to herein as a "partition") represents a discrete section of memory or discrete sections of a storage device such as a hard drive.

In some embodiments, a computing device may be configured to store the drivers, the OS, and the application along with the hibernation data on a first partition that can be protected by a write filter (e.g., MICROSOFT's Unified Write Filter (UWF) and/or Enhanced Write Filter (EWF)). When the computing device enters a "mission ready" functional state, the write filter is enabled to prevent user activity from altering the drivers, the OS, the applications, and/or the hibernation data that defines the "mission ready" functional state. When the write filter is enabled data writes that are intended for the first partition are redirected to a memory location, a virtual overlay, a different partition, or any other suitable storage location.

After receiving system updates from a remote resource (or an indication that system updates are available), the computing device can enter an update a (e.g., a protected update mode) in which the write filter is temporarily disabled to allow for the system updates to be installed to an otherwise write protected partition. During the update installation state, the updates are analyzed to determine if any of the updates impact aspects of the hibernation data. Aspects of the hibernation data that are impacted by the system updates cause the computing device to generate updated hibernation data. In some scenarios, some aspects of the original hibernation data are used to generate the updated hibernation data that accommodates the system updates. For example, in a scenario in which the system updates apply to the OS, updated hibernation data may be generated based on an analysis of an original instance of the OS and the updated instance of the OS.

In some embodiments, the computing device may further be configured to store duplicative original instances of the drivers, the OS, and/or the application on a second partition. Then, after installing the system updates on the first partition, the duplicative original instances of the drivers, the OS, and/or application on the second partition are compared to corresponding updated instances on the first partition to identify any libraries and/or registries that are impacted by the system updates. Relevant portions of the hibernation data are modified to generate the updated hibernation data which enables the computing device to repeatedly reenter the same "mission ready" functional state from the resume ready state. When the write filter is disabled, the computing device does not allow the user to interact with the OS or the applications. When the computing device re-enters a user mode such as, for example, the "mission ready" functional state the write filter is enabled. By the use of the updated hibernation data, the computing device can quickly cycle between the resume ready state and the "mission ready" functional state time and time again using the updated instances of the OS, the drivers, and/or the application.

As described above, conventional computing devices may be unable to install system updates (e.g., updates to drivers, an OS, and/or an application) without hibernation data that has been saved to facilitate repeated entering of a predefined "mission ready" functional state being rendered useless. For example, since hibernation data may generally correspond to memory contents that result in the predefined "mission ready" functional state, even slight changes to system components (and/or parameters thereof such as a registry and/or libraries) that are referenced by the hibernation data may cause a computing device to immediately crash or at least become highly crash susceptible. Among many other benefits, the techniques described herein improve efficiencies with respect to configuring computing devices to repeatedly resume into a "mission ready" functional state from a resume ready state (e.g., computing devices implementing MICROSOFT's Hibernate Once/Resume Many (HORM) functionality, or any other similar functionality). For instance, the techniques described herein enable a desired "mission ready" functional state, that is defined prior to system updates being installed, to be re-entered time and time again even after system updates are installed with respect to drivers, an OS, and/or an application. Thus, the described techniques improve computing efficiencies and/or human interaction with computers at least due to mitigating the burden of redefining the desired "mission ready" functional state subsequent to installing system updates. The described techniques also allow for system updates to installed without affecting a computing device's immediately usability. Thus, the described techniques improve computing security at least due to mitigating an end user's tendency to delay installation of security updates and/or malware definitions, e.g., due to the inconvenience of having to reconfigure the computing device following the installation process.

Turning now to FIG. 1, illustrated is an exemplary computing architecture 100 for regenerating hibernation data 120 based on system updates 108 to maintain an ability to repeatedly enter a "mission ready" functional state from a resume ready state following the system updates 108 being installed on a computing device 102. The computing device 102 maintains an ability to enter a "mission ready" functional state that was defined prior to installation of the system updates 108 by updating the hibernation data 120 to accommodate for the system updates 108. For example, aspects of the hibernation data 120 that define the "mission ready" functional state with respect to one or more system components prior to installation of the system updates 108 may be generated and configured to define the "mission ready" functional state with respect to one or more updated system components. Exemplary system components include, but are not limited to, drivers 110, an operating system (OS) 112, an application 114, a registry 116, and/or libraries 118. The example computing architecture 100 enables the computing device 102 to execute any aspects of the software components and/or functionality presented herein. Furthermore, the example computing architecture 100 illustrated in FIG. 1 shows an example architecture for an industry device (e.g., a Computer Numerical Control (CNC) device deployed in a manufacturing facility, a thin client device deployed in a healthcare facility, casino-gaming devices, Human Machine Interface (HMI) devices, and/or a Point-of-Sale (POS) device deployed in a brick and mortar retail facility), a personal computer (e.g., a laptop and/or desktop computer), a tablet computer, a smart phone, a server computer, a server rack, a network of server computers, or any other types of computing devices suitable for implementing the functionality described herein.

As illustrated in FIG. 1, the computing device 102 may include one or more drive(s) 104 (hereinafter referred to as the "drive") having computer-readable media that provides nonvolatile storage for the computing device 102. Exemplary drives include, but are not limited to, SATA-type solid-state hard drives, SATA-type hard disks, PATA-type solid-state hard drives, PATA-type hard disks, and/or any other drive-type suitable for providing non-volatile computer-readable media to a computing device. The drive 104 may include multiple partitions 106 for logically separating one or more system components and/or data objects. In the illustrated example, the drive 104 is separated into a first partition 106(1), a second partition 106(2), and an N-th partition 106(N). In some embodiments, at least one of the partitions 106 stores drivers 110 and an operating system (OS) 112 to enable a boot manager 130 to initiate the drivers 110 and to load the OS 112 into a memory 124. In the illustrated example, the memory 124 includes a random-access memory ("RAM") 126 and a read-only memory ("ROM") 128. As further illustrated, the computing device 102 includes a central processing unit ("CPU") 122 that is connected, via a bus 136, to the drive 104, the memory 124, and the boot manager 130. In some embodiments, the bus 136 further connects an input/output (I/O) controller 132 and/or a network interface 134.

It can be appreciated that the system components described herein (e.g., the drivers 110, the OS 112, and/or the application 114) may, when loaded into the CPU 122 and executed, transform the CPU 122 and the overall computing device 102 from a general-purpose computing system into a special-purpose computing system customized to facilitate the functionality presented herein. The CPU 122 may be constructed from any number of transistors or other discrete circuit elements, which may individually or collectively assume any number of states. More specifically, the CPU 122 may operate as a finite-state machine, in response to executable instructions contained within the software modules disclosed herein. These computer-executable instructions may transform the CPU 122 by specifying how the CPU 122 transitions between states, thereby transforming the transistors or other discrete hardware elements constituting the CPU 122.

The drive 104 and associated computer-readable media provide non-volatile storage for the computing device 102. Although the description of computer-readable media contained herein refers to a mass storage device, such as a solid-state drive and/or a hard disk, it should be appreciated by those skilled in the art that computer-readable media can be any available computer storage media or communication media that can be accessed by a computing architecture such as, for example, the computing architecture 100. Communication media includes computer-readable instructions, data structures, program modules, and/or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above are also included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing device 102. For purposes of the claims, the phrase "computer storage medium," "computer-readable storage medium," and variations thereof, does not include waves, signals, and/or other transitory and/or intangible communication media, per se.

The boot manager 130 may access the OS 112 from the drive 104 (or a partition thereof) and may load the OS 112 into the memory 124 for runtime execution by the computing device 102 (e.g., by invoking an OS boot loader). During execution of an OS booting protocol, the boot manager 130 (and/or an OS boot loader thereof) may identify the presence of (and/or verify a validity of) the hibernation data 120. Ultimately, the boot manager 130 may load the hibernation data 120 into the memory 124 to directly enter a predefined "mission ready" functional state from a powered down state (e.g., to enter the predefined "mission ready" functional state without any user actions).

The I/O controller 132 may receive and process input from a number of other devices, including a keyboard, mouse, or electronic stylus (not shown in FIG. 1). Similarly, the I/O controller 132 may provide output to a display screen, a printer, or other type of output device (also not shown in FIG. 1). The network interface 134 may enable the computing device 102 to connect to one or more network(s) 144 such as a local area network (LAN), a wide area network (WAN), a wireless local area network (WLAN), or any other suitable network for passing information between the computing device 102 and a remote resource 142.

As described above, the drive 104 may include multiple partitions 106 for logically separating one or more system components and/or data objects. In the illustrated example, the drive 104 includes the first partition 106(1) which stores instances of the drivers 110, the OS 112, the application 114, the registry 116, the libraries 118, and the hibernation data 120. The drivers 110 may include one or more programs for controlling one or more devices that are communicatively coupled to the computing device 102 such as, for example, printers, displays, cameras, soundcards, network cards, computer storage devices, etc. The OS 112 may be any suitable system software for managing computer hardware and/or software resources and for providing services to the application 114 and/or other applications (not shown). An exemplary OS 112 may include, but is not limited to, various versions of MICROSOFT WINDOWS (e.g., WINDOWS 8.1 or 10, WINDOWS EMBEDDED STANDARD 7, etc.), Mac OS X, iOS, etc.

The application 114 may be a computer program that is configured to be run by the OS 112 to perform one or more coordinated functions, tasks, activities. Exemplary applications 114 include, but are not limited to, applications configured to support one or more specific enterprise operations (e.g., a medical application for facilitating patient management, a commercial application for facilitating POS retail transactions and/or customer service, etc.) and/or general applications (e.g., a word processor and/or spreadsheet application, a web browser application, etc.).

The registry 116 may correspond to a database containing information usable to boot and/or configure the OS 112, system-wide software settings that control the operation of the OS 112, security databases, and/or user specific configuration settings. The registry 116 may further contain information associated with in-memory volatile data such as, for example, a current hardware state of the OS 112 (e.g., which drivers are currently loaded and in use by the OS 112).

The libraries 118 may include a collection of non-volatile resources that are usable (e.g., callable) by the application 114 and/or other applications (not shown). Exemplary resources include, but are not limited to, pre-written code and/or subroutines, configuration data, and/or classes (e.g., extensible program-code-templates for creating objects of various types). In various implementations, the libraries 118 may enable the application 114 to call upon various system services provided by the OS 112. For example, the libraries 118 may include one or more subsystem Dynamic Link Libraries (DLLs) configured for implementing and/or exposing Application Programming Interface (API) functionalities of the OS 112 to the application 114.

The hibernation data 120 may define a "mission ready" functional state of the computing device 102 and/or system components thereof. As used herein, the term "'mission ready' functional state" may refer to a specific "user mode" (e.g., a mode in which a user may interact with a computing device via I/O devices) operational state that is designed to support one or more specific enterprise functions (e.g., entering patient data, performing POS retail transactions, etc.). From a resume ready state, the hibernation data 120 may be loaded into the memory 124 to resume the computing device 102 into the "mission ready" functional state. It can be appreciated, therefore, that the hibernation data 120 may correspond to a snapshot of states across the various system components of the computing device 102 and may include data about the drivers 110, the OS 112, and any applications that are running at the time the hibernation data is recorded. Furthermore, it can be appreciated that the hibernation data may therefore indicate a state of function and/or a state of library. Generally, the hibernation data 120 corresponds to contents of the memory 124 that correspond to (e.g., result in) the "mission ready" functional state. For example, upon receipt of an instruction to save data defining the "mission ready" functional state, the computing device 102 (and/or a power manager thereof) may compress contents of the memory 124 and save the compressed contents of the memory 124 to the hibernation data 120 (e.g., in the form of a hibernation file such as, for example, a "Hiberfil.sys" file which may be saved in a root directory of a system volume). In configurations where the hibernation data 120 is stored on the drive 104, which provides non-volatile storage for the computing device 102, the computing device 102 may be fully powered down (or even abruptly lose power) without losing access to the hibernation data 120. When the computing device 102 is later turned on it may automatically transition to the resume ready state because the boot manager 130 may identify that the hibernation data 120 includes a valid memory image, e.g., the compressed contents of the memory 124. Then, the boot manager 130 may execute a specific booting protocol to cause the computing device 102 to reenter the "mission ready" functional state. For example, the boot manager 130 may launch a specific booting protocol (e.g., a "%SystemRoot%\System32\Winresume.exe") which reads the contents of the hibernation data 120 into the memory 124 and, ultimately, resumes runtime execution at that point in memory recorded in the hibernation data 120 (i.e., the "mission ready" functional state).

It can be appreciated that the contents of the memory 124 at any particular point in time may reference specific aspects of the system components such as, for example, the drivers 110, the OS 112, the application 114, the registry 116 and/or the libraries 118. Accordingly, even slight modifications to the underlying computer code for any individual one of the system components may render the hibernation data 120 invalid. For example, if the system components are modified then loading the hibernation data 120 into the memory 124 and resuming runtime execution may result in the computing device 102 immediately crashing or at least becoming highly susceptible to crashing.

In some embodiments, the drive 104 may redundantly store duplicative instances of the drivers 110, the OS 112, the application 114, the registry 116, the libraries 118, and/or the hibernation data 120. For example, in the illustrated embodiment, the drive 104 further includes a second partition 106(2) which stores duplicative instances of the illustrated system components. The duplicative instances are denoted in the figures by a prime symbol. Specifically, the second partition 106(2) is shown to include drivers 110', an OS 112', an application 114', a registry 116', libraries 118', and hibernation data 120'—each of which is substantially identical to a corresponding counterpart on the first partition 106(1). Accordingly, it can be appreciated that the boot manager 130 may access either the first partition 106(1) or the second partition 106(2) to boot the OS 112 and/or reenter the "mission ready" functional state from a powered down state and/or the resume ready state.

In various embodiments, the computing device 102 may be configured to preserve one or more instances of the system components and/or the hibernation data 120 to retain an ability to repeatedly re-enter "mission ready" functional state (e.g., upon being power cycled or restarted). For example, as further shown in FIG. 1, the computing device 102 may implement a stack 138 to enable the various system components to work together to produce one or more desired results. Furthermore, the stack 138 may include a write filter 140 that receives attempted data writes that are intended for one or more of the partitions 106 (or any other designated volume of the drive 104) and reroutes these attempted data writes to a virtual overlay or some other alternate storage location. As a more specific but nonlimiting example, the write filter 140 may be a filter driver that operates in the stack 138 just below a storage driver (e.g., included within the drivers 110) that is configured to facilitate data writing operations to the drive 104 and/or memory 124. In this example, from the perspective of the OS 112 it appears that the attempted data writes are being successfully written to the drive 104 whereas, in actuality, the state of any protected volumes of the drive 104 remaining unchanged from the time at which the hibernation data 120 was initially saved. Thus, any user actions that modify an operational state the system components may be flushed from the memory 124 (or a designated volume of the drive 104 if exceptions are established). For example, upon obtaining control of the computing device 102 from the "mission ready" functional state, a user may perform various operations which may create, edit, delete, or otherwise interact with various data stored in the memory 124. Despite the user performing these various operations, however, the computing device 102 may be caused to repeatedly reenter the whichever "mission ready" functional state is defined by the hibernation data 120 and preserved by the "enabled" write filter.

It can be appreciated that MICROSOFT's Hibernate Once/Resume Many (HORM) feature may represent an exemplary implementation of the foregoing techniques. Specifically, a computing device may be configured to always resume and restart from a last saved version of a hibernation file by deploying MICROSOFT's HORM feature in conjunction with a suitable write filter such as, for example, MICROSOFT's Unified Write Filter (UWF) and/or Enhanced Write Filter (EWF). Thus, in various implementations, the write filter 140 is configured to prevent data from being written to at least one of the first partition 106(1) or the second partition 106(2) to maintain an ability of the boot manager 130 to transition the computing device 102 between a resume ready state and a "mission ready" functional state. In some implementations, the drive 104 may include at least some storage volume(s) that remain unprotected with respect to the write filter 140. For purposes of the present discussion, assume that the write filter 140 is configured to by default (e.g., in a user mode) allow writes to the N-th partition 106(N).

When the write filter 140 is enabled, e.g., when in a "mission ready" functional state, the computing device 102 may be unable to save and/or install system updates 108 to any protected volumes of the drive 104. According to various implementations, in order to install the system updates 108, the computing device 102 may be configured enter an update installation mode during which the write filter 140 is temporarily disabled so that the system updates 108 can be saved and/or installed onto a storage volume that is by default write protected. In this illustrated example, the OS 112 determines that the system updates 108 have become available from a remote resource 142 via the one or more network(s) 144. For example, the system updates 108 may be an Over-the-Air (OTA) update associated with one or more of the drivers 110, the OS 112 and/or the application 114. Upon determining that the system updates 108 are available, the OS 112 may respond by avoiding any writes to the second partition 106(2). Instead, the updates are written to the first partition 106(1). While the write filter is disabled, the computing device 102 restricts any user operations. Thus, no data can be inadvertently and/or intentionally modified by a user.

Figure 2:
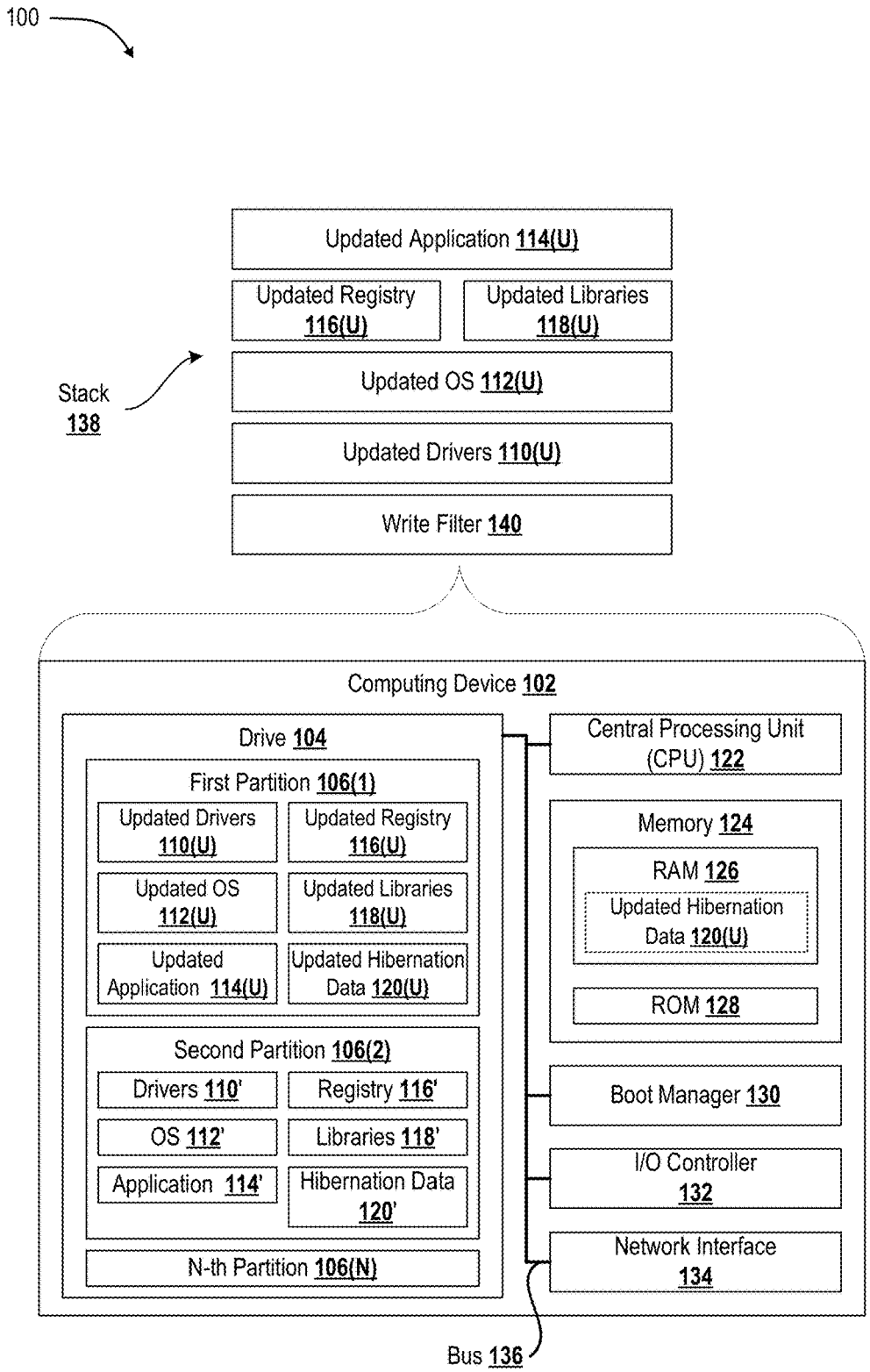
FIG. 2 illustrates the exemplary computing architecture of FIG. 1 following installation of the system updates resulting in at least some of system components of the computing device and the hibernation data having been updated.

Turning now to FIG. 2, the exemplary computing architecture 100 is illustrated following installation of the system updates 108 on the first partition 106(1) resulting in at least some of the system components and the hibernation data having been updated. In the illustrated example, aspects of each system component have been updated and, therefore, the first partition 106(1) is shown to include updated drivers 110(U), an updated OS 112(U), an updated application 114(U), an updated registry 116(U), and updated libraries 118(U). As described above, the contents of the memory 124 at any particular point in time may reference specific aspects of these system components such that even slight modifications to the underlying computer code for these system components may render the hibernation data 120 invalid. Thus, simply loading the original instance of the hibernation data 120 (e.g., a hibernation file generated prior to installation of the system updates 108) into the memory 124 and resuming runtime execution may cause the computing device 102 to crash. Therefore, the computing device 102 is configured to update the hibernation data 120 to generate updated hibernation data 120(U) that defines the same or substantially the same "mission ready" functional state as the hibernation data 120 but with particular aspects modified to accommodate for differences between the "original" system components and the updated system components.

In some implementations, the updated hibernation data 120(U) is generated by modifying aspects of the "original" hibernation data 120 that are affected by the system updates 108. The updated hibernation data 120(U) enables the boot manager 130 to initialize the computing device 102 into the "mission ready" functional state that was defined prior to installation of the system updates 108 even after the installation of the system updates 108. In various implementations, generating the updated hibernation data 120(U) may include identifying aspects of the updated system components that have been changed by the system updates 108 as compared to corresponding instances of the original system components (i.e., pre-update instances). In the illustrated example, the updated system components are stored on the first partition 106(1) and the duplicative instances of the original system components (i.e., the drivers 110', the OS 112', the application 114', the registry 116', and the libraries 118') are stored on the second partition 106(2). Accordingly, it can be appreciated that while operating in the protected update mode the computing device 102 may access both the first partition 106(1) as well as the second partition 106(2) to compare original instances of the system components and/or hibernation data 120 against the updated instances of the system components and/or updated hibernation data 120(U). Thus, in some configurations, the computing system can validate the updated hibernation data 120(U) by comparing the code in the first partition 106(1) and the second partition 106(2).

In scenarios where the system updates 108 include updates to the drivers 110, generating the updated hibernation data 120(U) may include identifying aspects of the updated drivers 110(U) that have been changed as compared to the duplicative instance of the original drivers 110'. Then, the updated hibernation data 120(U) may be generated by modifying portions of the original hibernation data 120 that are affected by the aspects of the updated drivers 110(U) that have been changed. For example, consider a scenario in which upon being discovered by an application, a particular driver 110 provides the application with information that defines a first high-level command prompt (e.g., a print command and/or a read command) that is usable by the application to call upon specific functionality of the particular driver 110. Further consider that following the system updates 108 being applied to the particular driver 110, the same specific functionality may be called upon albeit via a second high-level command prompt, e.g., the same functionality is called upon using a different command prompt. In this example, an original instance of the particular driver 110 may analyzed with respect to the updated instance of the particular driver 110(U) to identify that an application can call upon the same specific functionality by issuing the second high-level command prompt to the updated instance of the particular driver 110(U) as it could by issuing the first high-level command prompt to the original instance of the particular driver 110. According to this specific but nonlimiting scenario, generating the updated hibernation data 120(U) may include identifying references to the first high-level command prompt within the hibernation data 120 and swapping such references out for references to the second high-level command prompt.

In scenarios where the system updates 108 include updates to the OS 112, generating the updated hibernation data 120(U) may include identifying aspects of the updated OS 112(U) that have been changed as compared to the duplicative instance of the original OS 112'. Then, the updated hibernation data 120(U) may be generated by modifying portions of the original hibernation data 120 that are affected by the aspects of the updated OS 112(U) that have been changed. For example, consider a scenario in which aspects of the registry 116 and/or libraries 118 are defined by the OS 112 such that installing the system updates 108 with respect to the OS 112 may result in one or both of the registry 118 and/or libraries 118 also being updated. For example, the system updates 108 may cause a particular function that is callable from a first subsystem DLL in the original libraries 118 to be relocated to a second subsystem DLL. Accordingly, following the system updates 108 being installed, any reference to the first subsystem DLL within the memory 124 may fail to successfully call upon the particular function or, worse yet, because the computing device 102 to crash. In this example, generating the updated hibernation data 120(U) may include identifying references to the first subsystem DLL within the hibernation data 120 and swapping such references out for references to the second subsystem DLL.

As another specific but nonlimiting example, the original OS 112 may be configured to automatically load a predefined set of the drivers each time it is booted and to keep this predefined set of drivers loaded throughout operation. Then, the system updates 108 may result in the updated OS 112(U) being configured to automatically load and unload individual ones of the predefined set of the drivers only when they are needed, e.g., to free up computing resources. For example, upon initially booting the application 114 (or an updated version thereof), the updated OS 112(U) may determine which ones of the predefined set of drivers may potentially be called by the application 114 and may load these drivers into the memory 124. However, because the original hibernation data 120 would lack these drivers, under this scenario generating the updated hibernation data 120(U) may include identifying individual drivers that were automatically loaded into memory by the original OS 112 and modifying the original hibernation data 120 to include these drivers so they are available within the hibernation state subsequent to installation of the system updates 108.

In scenarios where the system updates 108 include updates to the application 114, generating the updated hibernation data 120(U) may include identifying aspects of the updated application 114(U) that have been changed as compared to the duplicative instance of the original application 114'. Then, the updated hibernation data 120(U) may be generated by modifying portions of the original hibernation data 120 that are affected by the aspects of the updated application 114(U) that have been changed. For example, consider a scenario in which the application 114 includes a plurality of tabs that a user may select to enter various operational states. As a more specific but nonlimiting example, the plurality of tabs may include a first tab that is selectable to cause the application 114 to display a patient's medical history, a second tab that is selectable to ready the application 114 for the user to enter data indicating that the patient has received a specified medication, a third tab that is selectable to cause the application 114 to notify medical personnel one or more action items that are due and/or upcoming with respect to the patient (e.g., which medications a patient is due to receive next and how long it is until they are due). For illustrative purposes suppose that the hibernation data 120 defines an operational state corresponding to selection of the third tab so that upon the computing device 102 being initially powered on in association with a particular patient, medical personnel are immediately and automatically notified of the upcoming actions. Further suppose that the system updates 108 add several additional functionalities to the application 114 and also rearranges the tabs so that the functionality that was previously associated with the third tab is changed to be associated with the first tab in the updated application 114(U). Under this specific but nonlimiting example, regenerating the hibernation data 120 may include identifying that the functionality associated with the "mission ready" functional state remains substantially the same but has been shifted from the third tab to the first tab. Then, the hibernation data 120 may be updated so that the updated hibernation data 120(U) resumes the updated application 114(U) with the first tab selected rather than the third as was previously selected in the original hibernation data 120.

Once the updates are complete, the computing device 102 to allow users to repeatedly transition the computing device 102 from the resume ready state to the "mission ready"

functional state. During such a transition, the write filter 140 can be enabled to allow user interaction with the OS and the applications without impacting the protected data. In the example shown in FIG. 2, the computing device 102 may enter the "mission ready" functional state from the first partition 106(1). Thus, the updated components and the updated hibernation data 120(U) are utilized.

It should be appreciated that although FIGS. 1 and 2 describe storing of the various instances and versions of the system components and the hibernation data 120 on the various partitions 106, this configuration is used for illustrative purposes only. In other implementations, the techniques described herein may be deployed by storing the various instances and versions of the system components in the hibernation data 120 on similar volumes of the drive 104 and/or on discrete volumes of the drive 104. For instance, the drive 104 may be formatted as a single volume, e.g., a single NTFS formatted partition with the various volumes thereof being designated as hidden, write protected, etc. In some implementations, each instance and/or version of the system components may be written to a discrete volume of the drive 104. In some implementations, each instance and/or version of the hibernation data 120 may be written to a discrete volume of the drive 104.

Figure 3:
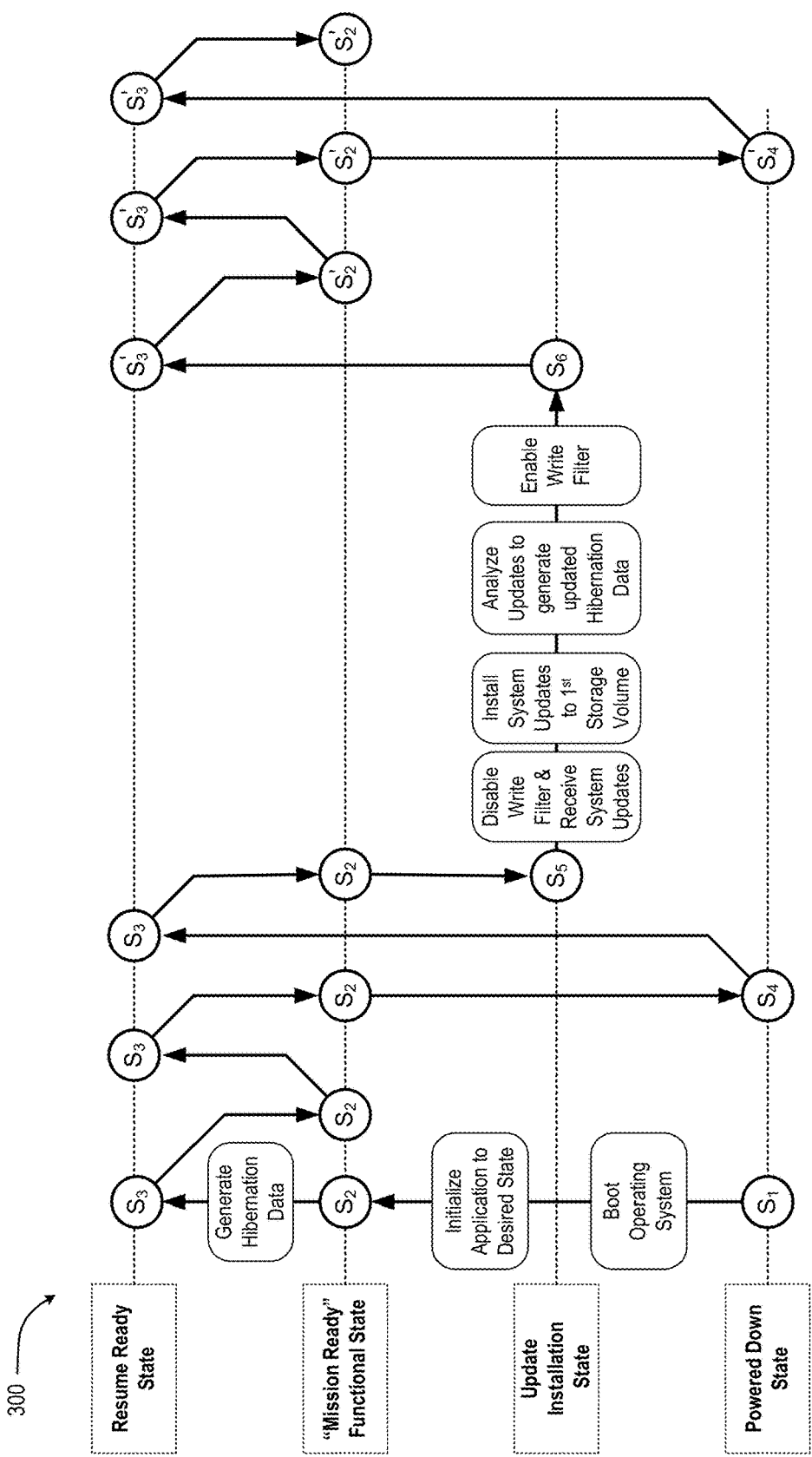
FIG. 3 illustrates a pictorial flow diagram of an exemplary process during which hibernation data corresponding to a functional state may be saved prior to receiving system updates and also during which the hibernation data may be used to generate updated hibernation data corresponding to the functional state following the system updates.

Turning now to FIG. 3, illustrated is a pictorial flow diagram of an exemplary process 300 during which hibernation data that defines a "mission ready" functional state may be saved prior to receiving system updates 108 and during which the hibernation data 120 may be used to generate updated hibernation data 120(U) that defines the hibernation state following installation of the system updates 108. The process 300 is described with reference to a plurality of system states and a plurality of operational states. Specifically, the process 300 is described with reference to nine discrete system states (labeled $S_1$ through $S_6$ and also $S'_2$, $S'_3$, and $S'_4$) and four operational states each labeled with a corresponding name on a dashed line. For purposes of the discussion referencing FIG. 3, operational states may refer to whether the computing device is powered on or off (e.g., whether the computing device is in the powered down state or in one of the other operational states), whether an OS and/or application is functioning in accordance with a "mission ready" functional state (e.g., due to the computing device having resumed runtime execution with a valid hibernation file loaded into memory), and/or whether the computing device is modifying vital system components within the update installation state. The discrete system states may be described with respect to what operational state a computing device is in and what data objects exist on the computing device (e.g., what version of system components and hibernation data are stored on the drive 104).

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims. It also should be understood that the illustrated methods can end at any time and need not be performed in their entireties. Some or all operations of the methods, and/or substantially equivalent operations, can be performed by execution of computer-executable instructions included on a computer-storage media, as defined herein.

At the system state $S_1$, a computing device such as, for example, the computing device 102 is in a power down state (e.g., the computing device is completely turned off and/or a power manager is restarting the computing device) and does not have hibernation data 120 stored in a manner designed so to cause the boot manager 130 to automatically load a corresponding hibernation file into the memory 124. For example, system state $S_1$ may correspond to the state that the computing device 102 is in when initially received from an original equipment manufacturer (OEM) and/or the state that the computing device 102 is in when turned off according to a power down protocol which does include generating a hibernation file.

As illustrated, between the system state $S_1$ and the system state $S_2$, the operating system (OS) 112 is booted which brings the computing device 102 into a "user mode" operational state. As used herein, the term "user mode" may refer generally to an operational state in which the OS 112 has been booted and control of the computing device 102 has been passed off to a user. In some instances, control of the computing device 102 may be passed off to a user at a default operational state of the OS 112. For example, in the process 300 because no hibernation data 120 exists at the system state $S_1$, the boot manager 130 may pass control of the computing device 102 over to the user at the default operational state of the OS rather than a "mission ready" functional state. For example, the default operational state may correspond to the state that the computing device 102 is in when first turned on after being received from the OEM and/or the state that the computing device 102 is in when turned on at a time when no valid hibernation file is saved in a designated non-volatile storage location. As described below, in some instances control of the computing device 102 may not be passed off to a user at the default operational state but rather the boot manager 130 may retain control until the computing device 102 has been resumed into the "mission ready" functional state.

Also between the system state $S_1$ and the system state $S_2$, the computing device 102 may receive various inputs that cause an application such as, for example, the application 114 to be initialized into the "mission ready" functional state. For purposes of the present discussion, the "mission ready" functional state may refer to a specific operational state during which the OS 112 is functional and operating in a user mode (e.g., a mode in which a user has been given control of the computing device 102) and during which the application 114 is in the desired operational state (e.g., as initially defined by the various inputs received between the system state $S_1$ and the system state $S_2$). Exemplary "mission ready" functional states include, but are not limited to, an operational state during which a Line-of-Business (LOB) application has been readied to perform a specific enterprise mission, e.g., a medical application has been readied to receive a data scan for patient management purposes, a commercial application has been readied to facilitate a POS retail transaction, etc.

In addition, between the system state $S_2$ and the system state $S_3$, hibernation data 120 is generated and stored. In one example, the hibernation data 120 is stored on a drive 104 so that upon being power cycled (e.g., turned off and then subsequently turned back on, restarted, etc.) the boot manager 130 and/or a boot loader thereof may recognize the presence of a valid memory image (e.g., stored in the form of a hibernation file) and, in response thereto, load the memory image directly into the memory 124. Also between the system state $S_2$ and the system state $S_3$, a write filter 140 is enabled to protect at least a volume of memory, such as the drive 104, on which the hibernation data 120 is stored. Stated another way, once the hibernation data is generated, it is saved to the drive 104 and marked read-only so that it will be preserved. Accordingly, it can be appreciated that at system state $S_3$ the computing device 102 has been placed into a resume ready state that can be repeatedly entered and from which the computing device 102 can resume into the "mission ready" functional state time and time again upon being power cycled. It will further be appreciated based on the following discussion, that the system state $S'_2$, $S'_3$, and $S'_4$ are updated counterparts of the system states $S_2$, $S_3$, and $S_4$, respectively.

As illustrated, from the system state $S_3$, the computing device 102 may be caused to directly reenter the "mission ready" functional state at $S_2$ as previously saved in the hibernation data. A user may then interact with the computing device 102 to perform the specific enterprise operation that the "mission ready" functional state is designed to facilitate. For example, a user may deploy the computing device 102 at a retail location to perform a POS transaction (e.g., selling a shirt to a consumer). Once finished, the user may cause the computing device 102 to transition back into the resume ready state at $S_2$ from which the computing device 102 may again resume into the "mission ready" functional state. During this transition, data associated with the user's previous interaction may be flushed so that the "mission ready" functional state is identical each time it is reentered.

As further illustrated, from the system state $S_2$, the computing device 102 is powered down into the system state $S_4$. For example, a user may press a power button on the computing device 102 to turn off and/or restart the computing device 102. Alternatively, the computing device 102 may crash (e.g., due to a system error). Alternatively, the computing device 102 may lose power (e.g., a power outage may occur at a manufacturing facility, a battery may run out, the computing device 102 may be inadvertently unplugged, etc.).

Between the system state $S_4$ and the system state $S_3$, the OS 112 is again booted and/or flashed to the memory 124 to bring the computing device 102 into an operational state. However, in contrast when the computing device 102 was powered on before the hibernation data 120 was generated and saved, control of the computing device 102 is not passed over to the user at the default operating system state. Rather, the boot manager 130 retains control of the computing device 102 (e.g., due to the presence of the saved hibernation data 120) until the computing device 102 is resumed into the "mission ready" functional state. For example, upon being powered on from the system state $S_4$, the boot manager 130 may identify the presence of the valid memory image and may load that memory image into the memory 124. Then, the boot manager 130 may load the memory 124 with the image to ultimately resume runtime execution from the "mission ready" functional state.

Accordingly, it can be appreciated that the "mission ready" functional state can be achieved according to at least two separate paths. In particular, the "mission ready" functional state can be achieved by first turning on the computing device 102 before the hibernation data 120 has been generated and then subsequently manipulating the application 114 into the desired state. Alternatively, the "mission ready" functional state can be achieved by resetting the computing device 102 (e.g., by instructing a power manager to reset the computing device 102 or by turning it off and then back on) after the hibernation data 120 has been generated. However, it can be appreciated that the former path has severe drawbacks as compared to the latter path. For example, utilizing the latter path offers benefits in terms of user interaction with the computing device 102 as each individual user is not required to understand how to manipulate the application 114 into the desired state. Additionally, utilizing the latter path offers benefits in terms of reduced time to usability of the computing device 102 because achieving the desired state of the application 114 by loading the memory image into the memory 124 takes considerably less time than instructing the OS 112 to initialize the application 114 from scratch.

As illustrated, the computing device 102 may again enter the system state $S_2$ and then, between the system state $S_2$ and the system state $S_5$, the computing device 102 is caused to enter an update installation state (e.g., a mode in which user actions are limited while system updates are installed). In some implementations, if the computing device 102 as not disabled the write filter 140, the computing device can disable the write filter 140 to allow receipt of the system updates 108. For example, as described with reference to FIG. 1, the remote resource 142 may push the system updates 108 to the computing device 102 in the form of an OTA update associated with one or more of the system components. If the computing device 102 is in hibernation mode, as shown, the write filter is disabled, which prevents user interaction with the computing device and causes the updates to be written to a memory block or partition that is separate than the original OS files or the original application files. the computing device 102 may install the system updates 108 on to a first storage volume of the drive 104. For example, as described with reference to FIG. 2, the system updates 108 may be installed onto the first partition 106(1).

In addition, the computing device analyzes the updates to determine if any of the updates impact aspects of the original hibernation data. Aspects of the hibernation data that are impacted by the update cause the computing device to generate updated hibernation data that is written to a memory block that is separate from the original hibernation data and separate from the original OS files. For example, the computing device 102 may analyze data stored on a second storage volume of the drive 104 to utilize the hibernation data 120 to generate the updated hibernation data 120(U). For example, as described above with reference to FIG. 2, the computing device 102 may compare one or more instances of the original system components (e.g., one or more of the drivers 110', OS 112', application 114', registry 116', and/or libraries 118' as they existed prior to installation of the system updates 108) to one or more instances of the updated system components (e.g., one or more of the updated drivers 110(U), the updated OS 112(U), the updated application 114(U), the updated registry 116(U), and/or the updated libraries 118(U)). Ultimately, the computing device 102 may identify aspects of the system components that have been modified based on the system updates 108 and may modify the hibernation data 120 to accommodate for the system updates 108.

Once the updated hibernation data is generated, the computing device 102 enables the write filter. By enabling the write filter, the computing device 100 can allow a user to transition the computing device 102 to the "mission ready" functional state, system state $S'_2$. It can be appreciated that system state $S'_2$ is the same or substantially the same as the system state $S_2$. In particular, although the system updates have been installed and the hibernation data has been updated at system state $S'_2$, the computing device 102 remains capable of repeatedly reentering the "mission ready" functional state as was defined between system states $S_1$ and $S_3$. Thus, even after the updates are installed, the computing device 102 can make repeated transitions between the resume ready state and the "mission ready" functional state. Each time the computing device 102 transitions from the resume ready state to the "mission ready" functional state, the computing device 102 can utilize the updated hibernation data in the updated files, e.g., the updated OS or updated application files. In some configurations, activity during the "mission ready" functional state can cause the generation of activity data which can be written to volatile memory, and such data can be flushed each time the computing device 102 transitions to the resume ready state.

Although in the illustrated implementation the system updates 108 are received by the computing device 102 while it is in the update installation mode, it can be appreciated that the that the system updates 108 may be received at various other operational states. For example, the computing device 102 may check for system updates 108 after being instructed to power up from the power down state but prior to achieving the functional state. Alternatively, the computing device 102 may receive the system updates 108 after the user has begun to manipulate aspects of the application 114 out of the "mission ready" functional state, e.g., the system updates 108 may be received while the user is actively using the computing device 102.

In the illustrated example, following installation of the system updates, the computing device transitions from the update installation mode at system state $S_6$ to the updated resume ready state $S'_3$. Then, any transitions described between the any of the system states $S_2$, $S_3$, and $S_4$ described herein as taking place before the system updates were installed can be take place between any of the system states $S'_2$, $S'_3$, and $S'_4$ in substantially the same way (e.g., in the same way in material part and/or from the perspective of a user). Thus, rather than a conventional computing device 102 which would require the time consuming and laborious manual operations described as taking place between the system states $S_1$ and $S_2$ to take place again after the updates, computing devices that are enhanced to perform the enhanced techniques for updating software as described herein do not require this time consuming and/or manual set-up process to take place again.

In some implementations, the system state $S_2$ that exists prior to the installation of the system updates 108 is identical to the system state $S'_2$ from the perspective of a human user of the computing device 102. For example, the system updates 108 may include updates to the drivers 110, the libraries 118, malware definitions that improve an operational efficiency and/or security of the computing device 102 in some way that is not immediately apparent to the user. For example, if the "mission ready" functional state of $S_2$ corresponds to a specific application being resumed at a specific operational state, the "mission ready" functional state of $S_3$ may also correspond to the same application being resumed to the same operational state.

In some implementations, the system state $S_2$ that exists prior to the installation of the system updates 108 is different than the system state $S'_2$ from the perspective of a human user of the computing device 102. For example, the system updates 108 may at least partially redefine the "mission ready" functional state so that the post-update "mission ready" functional state is designed to facilitate one or more operations that the pre-update "mission ready" functional state was not designed to facilitate. Thus, in some implementations, the system updates 108 may change the computing device 102 in some way that is immediately apparent to the user. For example, if the "mission ready" functional state of $S_2$ corresponds to a specific application being resumed at a specific operational state, the "mission ready" functional state of $S_3$ may also correspond to the same application or a different application being resumed to a different operational state.

In some implementations, generation of the updated hibernation data 120(U) commences after the system updates 108 have been successfully installed on the drive 104. For example, the computing device 102 may be configured to install the system updates 108 in their entirety and then compare the updated system components to the original system components. Alternatively, regeneration of the updated hibernation data 120(U) may occur concurrently with the installation of the system updates on the drive 104. For example, the computing device 102 may be configured to analyze updated portions of the system components and to modify corresponding aspects of the hibernation data 120 to accommodate for these portions being updated while other portions of the system components are being modified in accordance with the system updates 108.

In various implementations such as that shown in FIG. 3, subsequent to installation of the system updates 108 within the update installation state, no transition between system states exists that directly corresponds to the transition between system state $S_1$ and system state $S_2$ described as occurring prior to installation of the system updates 108. Therefore, the benefits described with relation to resuming the computing device 102 into the hibernation state by transitioning between the system states $S_6$ and $S_4$ as compared to transitioning between the system states $S_2$ and $S_3$ are retained subsequent to installation of the system updates 108. For example, the process of orchestration illustrated in FIG. 3 ensures that the computing device 102 remains in a fast boot state even after the system updates 108 have been installed. For example, the computing device 102 retains the ability to resume directly into the "mission ready" functional state that is specifically designed to enable the computing device to perform some predefined enterprise mission (e.g., recording patient information, facilitating a POS retail transaction, etc.) without a user having to manually manipulate the application 114 into the desired "mission ready" state and also without the OS 112 having to initialize (e.g., load) the application 114 from scratch.

EXAMPLE CLAUSES

The disclosure presented herein may be considered in view of the following clauses.

Example Clause A, a computer-implemented method comprising: transitioning a computing device from an operational state, of an operating system (OS) and an application that is being executed by the OS, to a mission ready functional state; storing hibernation data that defines the mission ready functional state; enabling a write filter to preserve the hibernation data, wherein the write filter preserves an ability to resume into the mission ready functional state by loading the hibernation data into a memory of the computing device; receiving an indication of one or more system updates associated with at least one system component, wherein the at least one system component includes at least one of a device driver, the OS, or the application; based at least in part on the indication, disabling the write filter to enable the computing device to install the one or more system updates with respect to the at least one system component to generate at least one updated system component; generating updated hibernation data by modifying the hibernation data to accommodate the at least one updated system component; subsequent to generating the updated hibernation data, enabling the write filter to preserve the updated hibernation data; transitioning the computing device into a resume ready state; and transitioning the computing device from the resume ready state to the mission ready functional state with the at least one updated system component by loading the updated hibernation data into the memory.

Example Clause B, the computer-implemented method of Example Clause A, wherein the storing the hibernation data that defines the mission ready functional state includes storing the hibernation data to a first volume, and wherein installing the one or more system updates includes installing the one or more system updates to a second volume that is different than the first volume.

Example Clause C, the computer-implemented method of Example Clause B, wherein prior to the disabling the write filter the computing device stores, across the first volume and the second volume, duplicative instances of at least one of the device driver, the OS, or the application.

Example Clause D, the computer-implemented method of any one of Example Clauses A through C, wherein the generating the updated hibernation data includes: identifying at least one aspect of the at least one updated system component that is modified as compared to the at least one system component; and generating updated hibernation data by modifying the hibernation data to accommodate the at least one aspect.

Example Clause E, the computer-implemented method of any one of Example Clauses A through D, wherein the at least one aspect includes at least one of a library or a registry that is modified during an installation of the one or more system updates.

Example Clause F, the computer-implemented method of any one of Example Clauses A through E, wherein the computing device enters an update installation state in association with the disabling the write filter, and wherein the computing device remains in the update installation state throughout: an installation of the one or more system updates, and the generating the updated hibernation data.

Example Clause G, the computer-implemented method of any one of Example Clauses A through F, wherein the indication, of the one or more system updates, that the disabling the write filter is at least partially based upon is received as an Over-the-Air (OTA) update from at least one remote resources.

Example Clause H, the computer-implemented method of any one of Example Clauses A through G, further comprising restricting at least some user operations while the write filter is disabled to prevent user activity from affecting at least one of an installation of the one or more system updates or the generating updated hibernation data.

Example Clause I, a computing device for retaining an ability to resume into a mission ready functional state following installation of one or more system updates, the computing device comprising: at least one drive; one or more processors; a memory in communication with the one or more processors, the memory having computer-readable instructions stored thereupon which, when executed by the one or more processors, cause the computing device to: store, to the at least one drive, hibernation data that is loadable into the memory to transition the computing device into the mission ready functional state; receive the one or more system updates from a remote resource, wherein the one or more system updates are designed to modify at least one system component; install, on the at least one drive, the one or more system updates with respect to the at least one system component to generate at least one updated system component; generate, based on the one or more system updates, updated hibernation data by modifying the hibernation data to accommodate the at least one updated system component; store the updated hibernation data to the at least one drive; and load the updated hibernation data into the memory to transition the computing device from a resume ready state into the mission ready functional state with respect to the at least one updated system component.

Example Clause J, the computer-implemented method of Example Clause I, wherein the computer-readable instructions further cause the computing device to: enable a write filter with respect to the at least one drive to prevent modifications of the hibernation data, wherein the write filter preserves the ability to resume into the mission ready functional state by loading the hibernation data into the memory; and based on an indication of the one or more system updates, disable the write filter to enable the computing device to store the updated hibernation data and the at least one updated system component to the at least one drive.

Example Clause K, the computer-implemented method of any one of Example Clauses I through J, wherein the computer-readable instructions further cause the computing device to restrict at least some user operations while the write filter is disabled to prevent user activity from affecting at least one of installation of the one or more system updates or generation of the updated hibernation data.

Example Clause L, the computer-implemented method of any one of Example Clauses I through K, wherein the hibernation data is stored on a first partition of the at least one drive, and wherein the updated hibernation data is stored on a second partition of the at least one drive.

Example Clause M, the computer-implemented method of any one of Example Clauses I through L, wherein the computer-readable instructions further cause the computing device to compare one or more original instances of the at least one system component with the at least one updated system component to generate the updated hibernation data, and wherein the one or more original instances are stored on a first partition of the at least one drive and the at least one updated system component that is stored on a second partition of the at least one drive.

Example Clause N, the computer-implemented method of any one of Example Clauses I through M, wherein the computer-readable instructions further cause the computing device to identify at least one aspect of the at least one updated system component that is modified as compared to the at least one system component, wherein the updated hibernation data is designed to accommodate the at least one aspect.

Example Clause O, the computer-implemented method of Example Clause N, wherein the at least one aspect includes at least one of a library or a registry that is modified during an installation of the one or more system updates.

Example Clause P, the computer-implemented method of any one of Example Clauses I through O, wherein the computer-readable instructions further cause the computing device to: receive, from a remote resource, an indication of an availability of the one or more system updates; and responsive to the indication, enter an update installation state to restrict at least some user operations during installation of the one or more system updates and during generation of the updated hibernation data.

Example Clause Q, the computer-implemented method of any one of Example Clauses I through P, wherein the at least one system component includes at least one of the OS, a device driver, or an application.

Example Clause R, a computer-implemented method comprising: storing, on at least one drive of a computing device, hibernation data that defines a mission ready functional state of an application with respect to an operating system (OS) of the computing device; preventing modifications of the hibernation data to preserve an ability, of the computing device, to resume into the mission ready functional state by loading the hibernation data into a memory; receiving an indication of one or more system updates associated with at least one system component, wherein the at least one system component includes at least one of a device driver, the OS, or the application; based at least in part on the indication, entering an update installation state to enable the computing device to: install the one or more system updates with respect to the at least one system component to generate at least one updated system component; identify at least one aspect of the at least one updated system component that is modified as compared to the at least one system component; and generate updated hibernation data by modifying the hibernation data to accommodate the at least one aspect; and storing, on the at least one drive, the updated hibernation data; and subsequent to the storing the updated hibernation data, preventing modifications of the updated hibernation data to preserve the ability to resume into the mission ready functional state by loading the updated hibernation data into the memory.

Example Clause S, the computer-implemented method of Example Clause R, wherein the storing the hibernation data includes writing the hibernation data to a first partition of the at least one drive, and wherein the storing the updated hibernation data includes writing the updated hibernation data to a second partition of the at least one drive.

Example Clause T, the computer-implemented method of any one of Example Clauses R through S, wherein the entering the update installation state includes disabling a write filter that is deployable, by the computing device, to prevent modifications to the hibernation data and the updated hibernation.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method comprising:
transitioning a computing device from an operational state, of an operating system (OS) and an application that is being executed by the OS, to a mission ready functional state;
storing hibernation data that defines the mission ready functional state to a first volume;
enabling a write filter to preserve the hibernation data, wherein the write filter preserves an ability to resume into the mission ready functional state by loading the hibernation data into a memory of the computing device;
receiving an indication of one or more system updates associated with at least one system component, wherein the at least one system component includes at least one of a device driver, the OS, or the application;
based at least in part on the indication, disabling the write filter to enable the computing device to install the one or more system updates with respect to the at least one system component to generate at least one updated system component, wherein installing the one or more system updates includes installing the one or more system updates to a second volume that is different than the first volume;
generating updated hibernation data by modifying the hibernation data to accommodate the at least one updated system component;
subsequent to generating the updated hibernation data, enabling the write filter to preserve the updated hibernation data;
transitioning the computing device into a resume ready state; and
transitioning the computing device from the resume ready state to the mission ready functional state with the at least one updated system component by loading the updated hibernation data into the memory.

2. The computer-implemented method of claim 1, wherein prior to the disabling the write filter the computing device stores, across the first volume and the second volume, duplicative instances of at least one of the device driver, the OS, or the application.

3. The computer-implemented method of claim 1, wherein the generating the updated hibernation data includes:
identifying at least one aspect of the at least one updated system component that is modified as compared to the at least one system component; and
generating the updated hibernation data by modifying the hibernation data to accommodate the at least one aspect.

4. The computer-implemented method of claim 3, wherein the at least one aspect includes at least one of a library or a registry that is modified during an installation of the one or more system updates.

5. The computer-implemented method of claim 1, wherein the computing device enters an update installation state in association with the disabling the write filter, and wherein the computing device remains in the update installation state throughout:
an installation of the one or more system updates, and
the generating the updated hibernation data.

6. The computer-implemented method of claim 1, wherein the indication, of the one or more system updates, that the disabling the write filter is at least partially based upon, is received as an Over-the-Air (OTA) update from at least one remote resource.

7. The computer-implemented method of claim 1, further comprising restricting at least some user operations while the write filter is disabled to prevent user activity from affecting at least one of an installation of the one or more system updates or the generating the updated hibernation data.

8. A computing device for retaining an ability to resume into a mission ready functional state following installation of one or more system updates, the computing device comprising:
at least one drive;
one or more processors;
a memory in communication with the one or more processors, the memory having computer-readable instructions stored thereupon which, when executed by the one or more processors, cause the computing device to:

store, to a first volume of the at least one drive, hibernation data that is loadable into the memory to transition the computing device into the mission ready functional state;

enable a write filter to preserve the hibernation data, wherein the write filter preserves an ability of the computing device to resume into the mission ready functional state by loading the hibernation data into the memory;

receive the one or more system updates from a remote resource, wherein the one or more system updates are designed to modify at least one system component;

disable the write filter to install, onto a second volume of the at least one drive, the one or more system updates with respect to the at least one system component to generate at least one updated system component, wherein the first volume is different than the second volume;

generate, based on the one or more system updates, updated hibernation data by modifying the hibernation data to accommodate the at least one updated system component;

store the updated hibernation data to the at least one drive;

subsequent to storing the updated hibernation data, enable the write filter with respect to the updated hibernation data to preserve the updated hibernation data; and load the updated hibernation data into the memory to transition the computing device from a resume ready state into the mission ready functional state with respect to the at least one updated system component.

9. The computing device of claim 8, wherein the computer-readable instructions further cause the computing device to:

enable a write filter with respect to the at least one drive to prevent modifications of the hibernation data, wherein the write filter preserves the ability to resume into the mission ready functional state by loading the hibernation data into the memory; and based on an indication of the one or more system updates, disable the write filter to enable the computing device to store the updated hibernation data and the at least one updated system component to the at least one drive.

10. The computing device of claim 8, wherein the computer-readable instructions further cause the computing device to restrict at least some user operations while a write filter is disabled to prevent user activity from affecting at least one of installation of the one or more system updates or generation of the updated hibernation data.

11. The computing device of claim 8, wherein the hibernation data is stored on a first partition of the at least one drive, and wherein the updated hibernation data is stored on a second partition of the at least one drive.

12. The computing device of claim 8, wherein the computer-readable instructions further cause the computing device to compare one or more original instances of the at least one system component with the at least one updated system component to generate the updated hibernation data, and wherein the one or more original instances are stored on a first partition of the at least one drive and the at least one updated system component is stored on a second partition of the at least one drive.

13. The computing device of claim 8, wherein the computer-readable instructions further cause the computing device to identify at least one aspect of the at least one updated system component that is modified as compared to the at least one system component, wherein the updated hibernation data is designed to accommodate the at least one aspect.

14. The computing device of claim 13, wherein the at least one aspect includes at least one of a library or a registry that is modified during an installation of the one or more system updates.

15. The computing device of claim 8, wherein the computer-readable instructions further cause the computing device to:

receive, from a remote resource, an indication of an availability of the one or more system updates; and responsive to the indication, enter an update installation state to restrict at least some user operations during installation of the one or more system updates and during generation of the updated hibernation data.

16. The computing device of claim 8, wherein the at least one system component includes at least one of the OS, a device driver, or an application.

17. A non-transitory computer-readable storage medium having stored thereon computer-executable instructions which, when executed by one or more processors, cause a computing device to:

transition from an operational state, of an operating system (OS), to a mission ready functional state of an application that is being executed by the OS;

store hibernation data that defines the mission ready functional state to a first volume;

enable a write filter to preserve the hibernation data, wherein the write filter preserves an ability of the computing device to resume into the mission ready functional state by loading the hibernation data into a memory of the computing device;

receive an indication of one or more system updates associated with at least one system component, wherein the at least one system component includes at least one of a device driver, the OS, or the application;

based at least in part on the indication, disable the write filter to enable the computing device to install the one or more system updates with respect to the at least one system component to generate at least one updated system component, wherein installing the one or more system updates includes installing the one or more system updates to a second volume that is different than the first volume;

generate updated hibernation data by modifying the hibernation data to accommodate the at least one updated system component;

subsequent to generating the updated hibernation data, enable the write filter to preserve the updated hibernation data;

transition the computing device into a resume ready state; and transition the computing device from the resume ready state to the mission ready functional state with the at least one updated system component by loading the updated hibernation data into the memory.

18. The non-transitory computer-readable storage medium of claim 17, wherein the computer-executable instructions further cause the computing device to:

identify at least one aspect of the at least one updated system component that is modified as compared to the at least one system component; and generate the updated hibernation data by modifying the hibernation data to accommodate the at least one aspect.

19. The non-transitory computer-readable storage medium of claim 17, wherein the computing device enters an update installation state in association with the disabling the write filter, and wherein the computing device remains in the update installation state throughout:
  an installation of the one or more system updates, and
  the generating the updated hibernation data.

20. The non-transitory computer-readable storage medium of claim 17, wherein the computer-executable instructions further cause the computing device to:
  restrict at least some user operations while the write filter is disabled to prevent user activity from affecting at least one of an installation of the one or more system updates or the generating the updated hibernation data.

* * * * *